United States Patent
Fujii

(10) Patent No.: US 6,700,597 B2
(45) Date of Patent: Mar. 2, 2004

(54) TWO DIMENSIONAL SCANNING IMAGE RECORDING METHOD AND IMAGE RECORDING APPARATUS WITH TWO-DIMENSIONALLY DISPOSED LIGHT SOURCE ELEMENTS

(75) Inventor: Takeshi Fujii, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/987,371

(22) Filed: Nov. 14, 2001

(65) Prior Publication Data

US 2002/0057328 A1 May 16, 2002

(30) Foreign Application Priority Data

Nov. 14, 2000 (JP) .................................... 2000-346574
Nov. 17, 2000 (JP) .................................... 2000-351148

(51) Int. Cl.[7] .............................................. B41J 2/435
(52) U.S. Cl. ...................................... 347/234; 347/248
(58) Field of Search .............................. 347/234, 238, 347/239, 248, 255, 241, 256; 355/47

(56) References Cited

U.S. PATENT DOCUMENTS

| 5,049,901 | A |  | 9/1991 | Gelbart ........................ 347/239 |
| 5,132,723 | A |  | 7/1992 | Gelbart ......................... 355/40 |
| 5,923,359 | A | * | 7/1999 | Montgomery ............... 347/255 |
| 6,204,875 | B1 | * | 3/2001 | De Loor et al. ............. 347/241 |

FOREIGN PATENT DOCUMENTS

| EP | 0 992 350 A1 | 4/2000 |
| JP | 2000-19662 B1 | 1/2000 |

* cited by examiner

Primary Examiner—Hai Pham
(74) Attorney, Agent, or Firm—Sughrue Mion, PLLC

(57) ABSTRACT

The image recording method and apparatus deflect light from a group of two-dimensionally disposed light source elements to move an image formed on a recording medium in accordance with a movement of the recording medium, or shift modulation data of the group of two-dimensionally disposed light source elements in a first moving direction of the recording medium on the group of two-dimensionally disposed light source elements in synchronism with the movement of the recording medium, and thereby have the image remain stationary relatively to the recording medium in the main scanning direction, as well as shift sequentially modulation data of the group of two-dimensionally disposed light source elements in a direction opposite to a second moving direction of the optical system in synchronism with a movement of the optical system in the auxiliary scanning direction, and thereby having the image also remain stationary relatively to the recording medium in the auxiliary scanning direction.

17 Claims, 14 Drawing Sheets

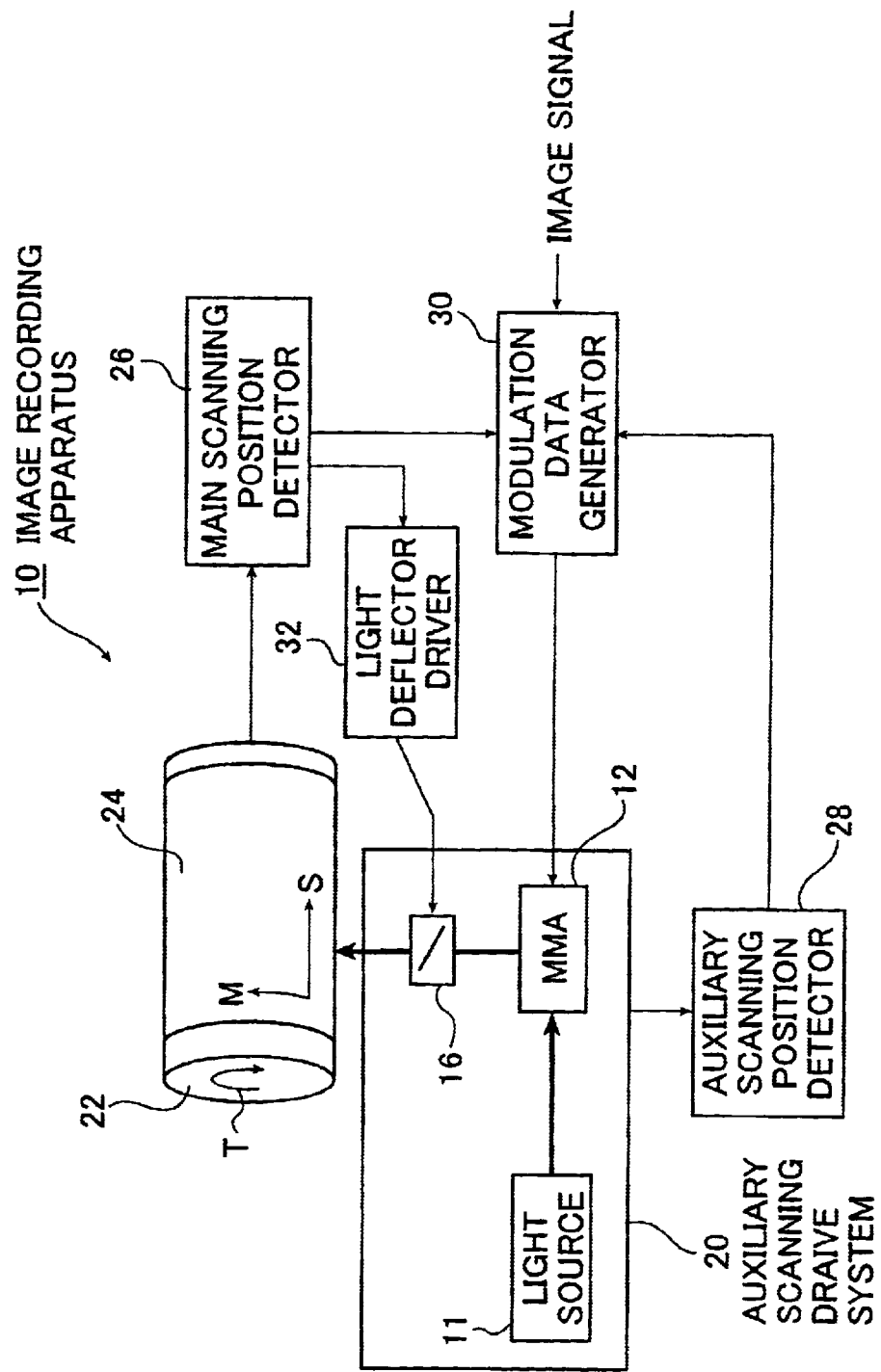

TWO DIMENSIONAL SCANNING IMAGE RECORDING METHOD AND IMAGE RECORDING APPARATUS WITH TWO-DIMENSIONALLY DISPOSED LIGHT SOURCE ELEMENTS

BACKGROUND OF THE INVENTION

The present invention relates to the technical field of an image recording method and an image recording apparatus, and more particularly, to an image recording technique using a group of light source elements of two-dimensional arrangement.

Mainly used in a digital image exposure system utilized in various types of printers is a so-called laser beam scan exposure (raster scan) for two-dimensionally exposing a recording medium with a laser beam modulated in accordance with an image to be recorded by deflecting the laser beam in a main scanning direction while relatively moving the recording medium and an optical system in an auxiliary scanning direction perpendicular to the main scanning direction.

In contrast, in recent years, various types of digital image exposure systems have been proposed, which use two-dimensional spatial light modulators (2DSLM) such as a liquid crystal display (hereinafter, referred to as "LCD") and the micro mirror array (hereinafter, referred to as "MMA") such as, for example, a digital micromirror device (trade mark hereinafter referred to as "DMD") manufactured by Texas Instruments Inc.), which are utilized as display devices in displays, monitors and so on. In the exposure systems, a recording medium is basically exposed by forming an image displayed by the two-dimensional spatial light modulator on the recording medium.

In particular, the MMA is advantageous in exposure at high speed because the MMA has a modulation speed (response speed) faster than that of the LCD and moreover utilizes light more efficiently than the LCD.

Digital exposure systems using the spatial light modulator are disclosed in, for example, U.S. Pat. No. 5,049,901 B, EP 0992350 Al B, U.S. Pat. No. 5,132,723 B and JP 2000-19662 B.

The digital exposure systems disclosed in these publications each relate to an image recording apparatus in which an image is formed on a spatial light modulator such as the MMA in the form of an image signal and the image signal is imaged on a recording medium for recording. In the digital exposure systems, the image on the spatial light modulator is moved in synchronism with the movement or the recording medium, which is moved in a main scanning direction so that the image can remain stationary on the recording medium. This operation enables image recording of high resolution by obtaining a small recording light spot from an extended light source, which has difficulty in narrowing the area.

The principle of an image recording method using the conventional spatial light modulator will be described with reference to FIGS. 12A to 12C. As shown in FIG. 12A, light impinges on a spatial light modulator 80 and is reflected by a mirror 80a, and the reflected light is imaged onto a recording medium 84 through an optical system such as a lens 82, etc. It is assumed that the recording medium 84 moves at a constant speed as shown by the arrow shown in FIG. 12A. In FIG. 12A, only the mirror 80a is activated and mirrors 80b and 80c are deactivated, and only the light reflected by the mirror 80a is imaged onto the recording medium 84.

Next, when the recording medium 84 slightly moves as shown in FIG. 12B, the mirror 80a in the spatial light modulator 80 is deactivated and only the mirror 80b is activated instead in synchronism with the movement of the recording medium 84, and the same point on the recording medium 84 as shown in FIG. 12A is exposed to the light reflected by the mirror 80b.

Further, when the recording medium 84 moves as shown in FIG. 12C, only the mirror 80c in the spatial light modulator 80 is activated in synchronism with the movement of the recording medium 84 and images at the same position on the recording medium 84.

As described above, in the illustrated example, the spatial light modulator 80 changes image signaling (moves image data) three times so that each of the mirrors 80a, 80b and 80c exposes the recording medium 84 once, in total three times. As a result, the image is moved in synchronism with the movement of the recording medium 84 so as to remain stationary on the recording medium 84 in a main scan direction (a moving direction of the recording medium).

The (one-dimensional) movements of the mirrors concerning one pixel have been described in the above description. In reality, however, for instance, an image is recorded in the manner shown in FIG. 13 with this conventional image recording method. A recording medium 92 is wound around the external surface of a rotating drum 90, and image recording is performed by two-dimensionally exposing the recording medium 92 using an optical system that uses an image forming lens 96 and a two-dimensional spatial light modulator 94 (a group of two-dimensionally disposed light sources) irradiated with an illumination light flux. The rotating drum 90 rotates in the direction shown by the arrow T shown in FIG. 13. Also, an image is two-dimensionally recorded by setting the direction shown by the arrow M shown in FIG. 13 as the main scanning direction and setting the direction shown by the arrow S as the auxiliary scanning direction.

With the two-dimensional spatial light modulator 94, an image to be recorded onto the recording medium 92 is divided into small segments and image recording is performed for each unit of one segment (hereinafter, referred to as the "frame"). Here, for ease of explanation, it is assumed that the two-dimensional spatial light modulator 94 includes 5×10 micromirrors. In this case, one frame is composed of 5×10 pixels. In FIG. 13, one frame of an image that is currently being recorded (exposed) is indicated by the reference symbol "G" and frames that have already been recorded are specified by the reference symbol "G0". The rotating drum 90 continuously rotates at a constant speed in the direction of the arrow T, so that if the two-dimensional spatial light modulator 94 only exposes the frame G at the illustrated position, the recorded image of one frame G flows in accordance with the rotation of the rotating drum 90.

In view of this problem, as shown in FIGS. 14A to 14C, the image data on the two-dimensional spatial light modulator 94 is switched to have the recorded image of the frame G remain stationary on the recording medium 92. In more detail, while data shown in FIG. 14A is being sent to the two-dimensional spatial light modulator 94, the recording medium 92 moves downward in the drawing in accordance with the rotation of the rotating drum 90. Therefore, as shown in FIG. 14B, image data is switched so that the image data on the two-dimensional spatial light modulator 94 is shifted downward by one pixel (downward by one line) in its entirety in synchronism with the movement of the recording medium 92. When the recording medium 92 further moves downward by one pixel (by one line) in accordance with the rotation of the rotating drum 90, the image data is further switched as shown in FIG. 14C so that the image data on the two-dimensional spatial light modulator 94 is shifted again downward by one line in its entirety.

By switching the image data on the two-dimensional spatial modulator 94 in synchronism with the rotation of the rotating drum 90 in this manner, the recorded image can remain stationary on the recording medium 92 and image flow is prevented.

Following this, when the rotating drum 90 has rotated once and image recording for one line is finished, the optical system including the two-dimensional spatial light modulator 94 or the like is moved in the auxiliary scanning direction S by one frame (by ten pixels in this example) while the rotating drum 90 is making the next rotation. Then, image recording in the main scanning direction M is performed for the next line in the same manner as above during the still next rotation of the drum 90.

With the conventional image recording method described above, however, the image data of one frame held by the two-dimensional spatial light modulator 94 is switched (shifted) in synchronism with the rotation of the rotating drum 90. Also, when the recording of one line corresponding to one rotation of the rotating drum is finished and the next one line is to be recorded, the image data of one frame needs to be rewritten in its entirety. Accordingly, it is required to quickly rewrite modulation data for driving the two-dimensional spatial light modulator 94 many times, which imposes an enormous burden on an apparatus. Also, the image recording (of one line) in the main scanning direction and the moving of the optical system in the auxiliary scanning direction are repeatedly performed and image recording is performed only for one line while the drum is making two rotations. This causes a problem in that the scanning efficiency during image recording is reduced and the productivity is decreased. Also, the optical system is not continuously moved in the auxiliary scanning direction. That is, an operation for mechanically moving the optical system in the auxiliary scanning direction and an operation for stopping the movement are repeatedly performed. This causes a problem in that vibrations are generated in an apparatus and the durability and reliability of the apparatus are impaired.

Also, as shown in FIG. 15, with another conventional image recording method using a spatial light modulator, light from a light source (not shown) is reflected by a spatial light modulator 180 and recording light that carries an image is imaged onto a recording medium 184 through an image forming lens 182, thereby forming an image 186. The recording medium 184 moves at a constant speed as shown by the arrow A in this drawing. Accordingly, if only the image 186 is exposed for a long time, the image 186 flows in accordance with the movement of the recording medium 184. In view of this problem, the operation described below is performed in order to have the image 186 remain stationary on the recording medium 184 relatively.

Here, it is assumed that, as shown in FIG. 16 A, modulation data "G0, G1, G2, G3, . . . , H0, H1, . . . , I0, . . . , J0, . . . , and K0, . . . " exists on the spatial light modulator 180 and image recording is performed according to this modulation data. It is also assumed that the arrangement direction of pixels "G0, H0, I0, J0, and K0" (a column direction) coincides with the direction A in which the recording medium 184 moves, while the arrangement direction of pixels "G0, G1, G2, G3, . . . " (a row direction) is a direction perpendicular to the moving direction A of the recording medium 184. In this case, the recording medium 184 moves downward in FIG. 16A (in the direction of the arrow A), so that if the spatial light modulator 180 continuously holds this modulation data, an image on the recording medium 184 flows in the moving direction of the recording medium 184.

In view of this problem, as shown in FIG. 16B, when the recording medium 184 moves downward by one pixel, the modulation data is shifted downward by one line on the spatial light modulator 180. In more detail, the modulation data "G0, G1, . . . " on the first row is shifted to the second row and the modulation data on each of other rows is also shifted downward by one row. Then, the next modulation data "F0, F1, F2, F3, . . . " is newly sent to the first row.

When the recording medium 184 further moves downward by one pixel, the modulation data on each row is shifted downward by one line on the spatial light modulator 180 and new modulation data "E0, E1, E2, . . . " is introduced onto the first row, as shown in FIG. 16C.

By shifting the modulation data on the spatial light modulator in accordance with the movement of the recording medium in this manner, it becomes possible to have an image remain stationary on the recording medium relatively.

With this conventional image recording method, however, scanning is performed in a one-dimensional direction and an image can remain stationary only relatively to the movement in this one-dimensional direction. Therefore, if this method is applied to a case of two-dimensional scanning typified by an external surface cylinder type recording apparatus without any changes, for instance, there occurs a problem in that a recorded image is distorted like a parallelogram. This problem will be described below.

That is, as shown in FIG. 17, a recording medium 198 is wound around the external surface of a rotating drum 196 and light reflected by a spatial light modulator 190 is imaged onto the recording medium 198 through an image forming lens 192, thereby recording an image. Note that the rotating drum 196 rotates in the direction of the arrow T, the direction in which the rotating drum 196 rotates is set as the main scanning direction M and the direction of a rotational axis that is perpendicular to the direction M is set as the auxiliary scanning direction S. An optical system including the spatial light modulator 190, the image forming lens 192 and the like is mounted on an auxiliary scanning transport means 194 and is moved in the auxiliary scanning direction S.

While the rotating drum 196 is rotating once, the modulation data is controlled in the manner described above and an image 199a on the first column is recorded while shifting the modulation data on the spatial light modulator 190 in the one-dimensional direction. At this time, if a recording method called "step and repeat" is used, while the image 199a on the first column is being recorded, the optical system is not moved in the auxiliary scanning direction. When the image recording for the first column is finished, the optical system is moved in the auxiliary scanning direction S during the next rotation of the rotating drum 196, and an image 199b on the second column is recorded during the next rotation of the rotating drum 196. With this recording method, image recording is performed only once (for one line) while the rotating drum is making two rotations, so that the recording efficiency is extremely low.

To solve this problem, image recording is successively performed by moving the optical system using the auxiliary scanning transport means 194 at a constant speed in the auxiliary scanning direction S. In this case, if modulation data is one-dimensionally shifted on the spatial light modulator 190 only in the main scanning direction M like in the cases of the conventional techniques, there occurs a problem in that a recorded image 199 is distorted like a parallelogram on the recording medium 198, as shown in FIG. 18.

SUMMARY OF THE INVENTION

In order to attain the first object described above, the first aspect of the present invention provides an image recording method in which when an image is recorded on one recording medium of a drum-shaped recording medium rotating at a first constant speed and a recording medium held on an external surface of a drum rotating at the first constant speed, the image being recorded by performing main scanning and exposure on the one recording medium with an optical system that uses a group of two-dimensionally disposed light source elements as well as by performing auxiliary scanning by moving the optical system in an auxiliary scanning direction that is substantially perpendicular to a main scanning direction, comprising the steps of:

deflecting light from the group of two-dimensionally disposed light source elements to move the image formed on the one recording medium in accordance with a movement of the one recording medium, thereby having the image remain stationary relatively to the one recording medium in the main scanning direction; moving the optical system at a second constant speed in the auxiliary scanning direction; and sequentially shifting modulation data of the group of two-dimensionally disposed light source elements in a direction opposite to a moving direction of the optical system in synchronism with a movement of the optical system in the auxiliary scanning direction, thereby having the image also remain stationary relatively to the one recording medium in the auxiliary scanning direction.

Preferably, when recording of the image of one frame, which is an image area to be recorded on the one recording medium by the group of two-dimensionally disposed light source elements by one operation, is finished and recording of the image of the next frame is performed, a deviation between the preceding frame and the next frame in the auxiliary scanning direction is an integral multiple of a recording pixel.

In order to attain the first object described above, the second aspect of the present invention provides an image recording apparatus, comprising: one recording medium of a drum-shaped recording medium rotating at a first constant speed and a recording medium held on an external surface of a drum rotating at the first constant speed; an optical system that uses a group of two-dimensionally disposed light source elements for exposing the one recording medium in a main scanning direction that is a first moving direction of the one recording medium; a modulation data generator that controls modulation data to be supplied to the group of two-dimensionally disposed light source elements; and an auxiliary scanning drive system that moves the optical system in an auxiliary scanning direction that is substantially perpendicular to the main scanning direction, wherein the optical system includes a deflector that deflects light from the group of two-dimensionally disposed light source elements, an image formed on the one recording medium is moved in accordance with a movement of the one recording medium by deflecting the light using the deflector, thereby having the image remain stationary relative to the one recording medium in the main scanning direction, and the auxiliary scanning drive system moves the optical system at a second constant speed in the auxiliary scanning direction and the modulation data generator sequentially shifts the modulation data of the group of two-dimensionally disposed light source elements in a direction opposite to a second moving direction of the optical system in synchronism with a movement of the optical system in the auxiliary scanning direction, thereby having the image also remain stationary relative to the one recording medium in the auxiliary scanning direction.

Preferably, when recording of the image of one frame, which is an image area to be recorded on the one recording medium by the group of two-dimensionally disposed light source elements by one operation, is switched to recording of the image of the next frame, the auxiliary scanning drive system drives the optical system in the auxiliary scanning direction so that a deviation between the preceding frame and the next frame in the auxiliary scanning direction becomes an integral multiple of a recording pixel.

In order to attain the second object described above, the third aspect of the present invention provides an image recording method in which when an image is recorded on a recording medium that is moved in a given direction at a constant speed relative to an optical system that uses a group of two-dimensionally disposed light source elements, the image being recorded by performing main scanning on the recording medium in the given direction with the optical system as well as by performing auxiliary scanning by moving the optical system relative to the recording medium in an auxiliary scanning direction that is substantially perpendicular to the main scanning direction, comprising steps of: shifting modulation data of the group of two-dimensionally disposed light source elements in a first moving direction of the recording medium on the group of two-dimensionally disposed light source elements in synchronism with a movement of the recording medium, thereby having the image remain stationary relative to the recording medium in the main scanning direction; and moving the optical system at a constant speed in the auxiliary scanning direction and shifting the modulation data on the group of two-dimensionally disposed light source elements in a direction opposite to a second moving direction of the optical system in accordance with an image recording position in the main scanning direction, thereby having the image also remain stationary in the relative relation to the recording medium in the auxiliary scanning direction and suppressing parallelogram-like distortion of the image recorded on the recording medium.

Preferably, a spatial light modulator that reflects an illumination light flux from a light source or allows the illumination light flux to pass through is used as the group of two-dimensionally disposed light source elements.

In order to attain the second object described above, the fourth aspect of the present invention provides an image recording apparatus, comprising: an optical system that uses a group of two-dimensionally disposed light source elements; a recording medium that moves in a given direction at a first constant speed relative to the optical system, an image being two-dimensionally recorded on the recording medium by performing main scanning in the given direction using the optical system and performing auxiliary scanning in a direction that is substantially perpendicular to the main scanning direction; a modulation data controller that controls modulation data to be supplied to the group of two-dimensionally disposed light source elements; and an auxiliary scanning drive system that moves the optical system in an auxiliary scanning direction at a second constant speed relative to the recording medium, wherein the modulation data is shifted in a first moving direction of the recording medium on the group of two-dimensionally disposed light source elements in synchronism with a movement of the recording medium, thereby having the image remain stationary relative to the recording medium in the main scanning direction, and the modulation data is shifted in a direction opposite to a second moving direction of the optical system on the group of two-dimensionally disposed light source elements in accordance with an image recording position in the main scanning direction, thereby having the image also remain stationary relatively to the recording medium in the auxiliary scanning direction and suppressing parallelogram-like distortion of the image recorded on the recording medium.

Preferably, a spatial light modulator that reflects an illumination light flux from a light source or allows the illumination light flux to pass through is used as the group of two-dimensionally disposed light source elements.

BRIEF DESCRIPTION OF THE DRAWINGS

In the accompanying drawings:

FIG. 2 is a block diagram showing a recording timing control system of the image recording apparatus of the embodiment in accordance with the embodiment of the present invention;

Figures 14A, 14B, 14C:
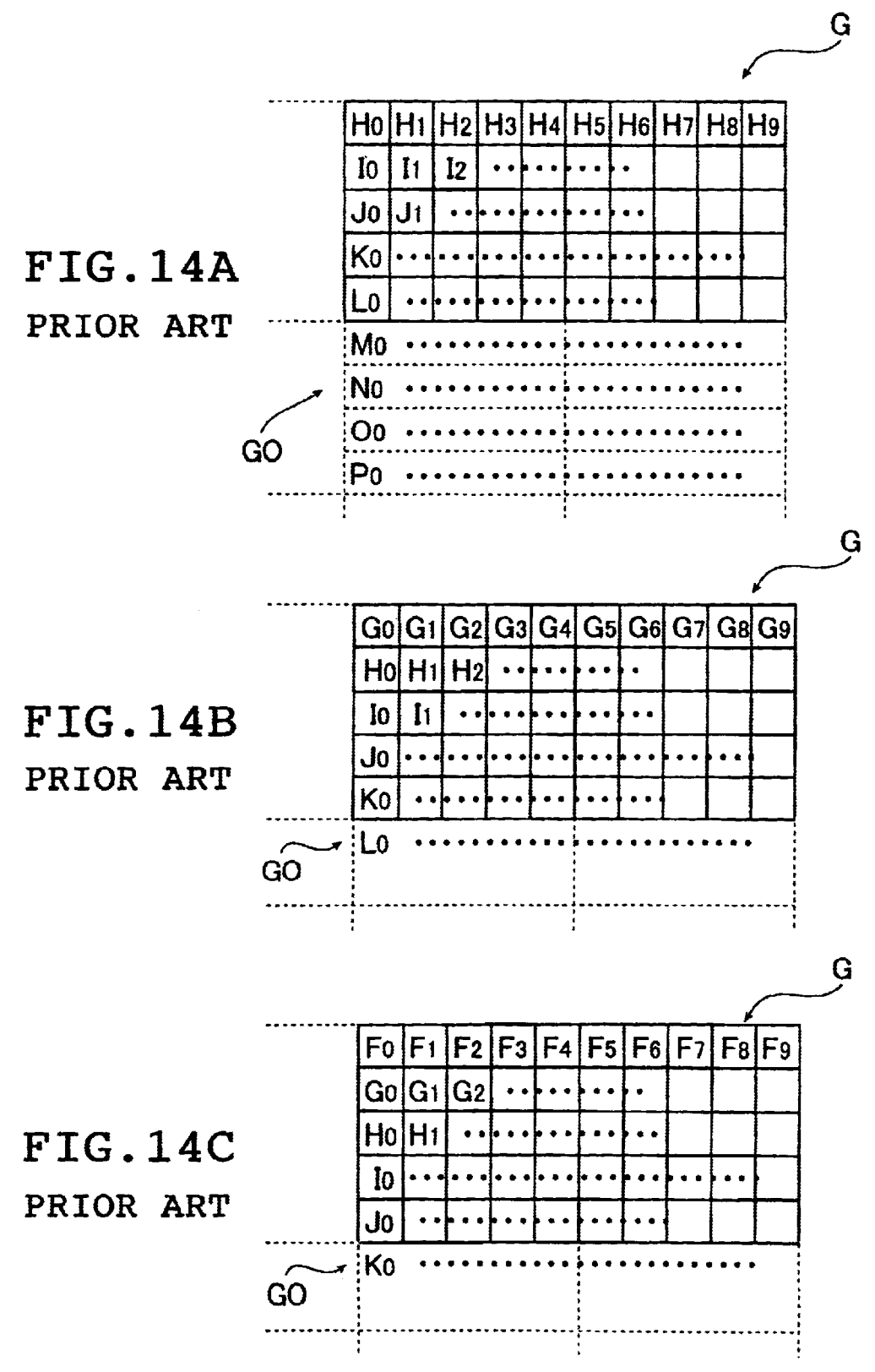

FIGS. 14A, 14B, and 14C each illustrate a conventional image recording method performed by the image recording apparatus shown in FIG. 13;

DETAILED DESCRIPTION OF THE PREFERRED EMBODIMENTS

An image recording method and an image recording apparatus of the present invention will be described below in detail with reference to preferable embodiments shown in the accompanying drawings.

First, an image recording method in accordance with a first aspect of the present invention and an image recording apparatus in accordance with a second aspect of the present invention will be described with reference to FIGS. 1 to 5.

Figure 1:
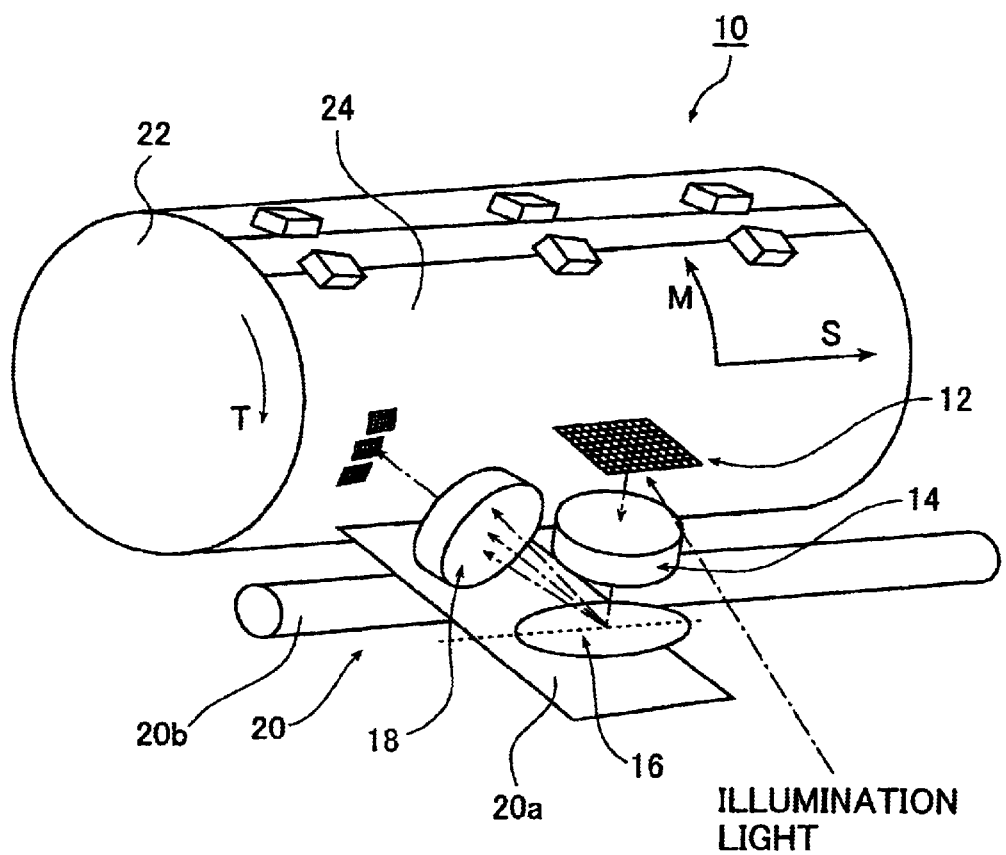
FIG. 1 is a perspective view showing the schematic construction of an image recording apparatus in accordance with an embodiment the present invention.

FIG. 1 is a perspective view showing the schematic arrangement of the image recording apparatus in accordance with the second embodiment of the present invention to realize the image recording method in accordance with the first aspect of the present invention.

The illustrated image recording apparatus 10 is an apparatus for recording an image by two-dimensionally scan-exposing a recording medium attached to a so-called outer drum (external surface drum), which rotates at a constant speed, in which a micro mirror array (hereinafter, referred to as "MMA") is used, which is a two-dimensional spatial light modulator to be irradiated with an illumination light flux as a group of two-dimensionally disposed light source elements, for example, a DMD (digital micromirror device (trade mark)).

In FIG. 1, the image recording apparatus 10 includes a light source (not shown in FIG. 1, but indicated by reference numeral 11 in FIG. 2), a MMA 12 for receiving illumination light emitted from the light source, a collimator lens (light collimator) 14, a light deflector (deflector) 16, a focusing lens 18, an auxiliary scanning drive system 20, an external drum (outer drum) 22 (hereinafter simply referred to as "drum") and a drive source (not shown) for driving the drum 22 to rotate at a constant speed. Further, the drum 22 has a recording medium 24 attached to be wound around the outside surface thereof.

While not shown in FIG. 1, as the light source (indicated by reference numeral 11 in FIG. 2), expanded light sources and the like can be used, however any light sources can be used as long as they can emit a sufficient quantity of light. Various types of light sources can be used in accordance with the spectral sensitivity of the recording medium 24 used. For example, a ultra-high pressure mercury lamp, a metal halide lamp, and the like may be used as the light source when a plate-making film and a conventional PS plate which are sensitive to visible light and ultraviolet light, are used as the recording medium. Further, an infrared broad area laser diode, and the like may be used in the case of a heat mode film and a heat mode plate (a PS plate) which are sensitive to infrared light. In addition to the above, a LED, a halogen lamp, a xenon lamp, a fiber laser, a solid laser, and the like may also be used in accordance with the recording medium used.

The MMA 12 is a two-dimensional spatial light modulator in which rectangular micromirrors capable of rotating (swinging) by a predetermined angle about a predetermined rotation axis are two-dimensionally disposed, and the electrostatic rotation of the micromirrors modulates light by activating and deactivating each micromirror (=pixel) for exposure. The MMA 12 is formed on a silicon chip by a micromachine technology making use of a process for manufacturing a semiconductor device. Further, the size of the MMA 12 is not particularly limited, and the MMA 12, for example, used in the image recording apparatus 10 of the illustrated case has, for example, 1024×1280 pixels with intervals therebetween set to 17 μm. Furthermore, respective components are disposed such that the rotational direction (shown by an arrow T in FIG. 1) of the drum 22 to be described later, can optically agree with the direction of the pixel train corresponding to the 1024 pixels of the MMA 12 (hereinafter, the direction shown by an arrow M in FIG. 1 is referred to as a "main scanning direction") and that the axial direction of the drum 22 can optically agree with the direction of the pixel train corresponding to the 1280 pixels of the MMA 12 (hereinafter, the direction shown by an arrow S in FIG. 1 is referred to as an "auxiliary scanning direction").

Note that the spatial light modulator of the two-dimensional arrangement as a light source element used in the present invention is not limited to the MMA 12 of the illustrated case, and various types of modulators such as liquid crystal type, PLZT type, EO (electrooptical) type and AO (acoustooptic) type can be used. However, the MMA is most preferable among them from the viewpoint of a modulation speed, efficiency for light utilization, and the like.

The collimator lens 14 is used to allow the light reflected by the MMA 12 to be incident on the light deflector 16 as collimated light.

The light deflector 16, the operation of which will be described in detail later, deflects the light incident through the collimator lens 14 in the main scanning direction in synchronism with the rotation of the drum 22. That is, the light deflector 16 is driven by a drive unit (refer to a light deflector driver 32 in FIG. 2) not shown in FIG. 1 and changes the direction of light in synchronism with the relative movement of the recording medium 24 due to the rotation of the drum 22 in the rotating direction of the drum 22 so that the image data of one frame is imaged at the same position on the recording medium 24 in the main scanning direction even if the recording medium 24 relatively moves. Preferred examples of the light deflector 16 include a galvano-scanner, a polygonal mirror, a piezo system, and devices for shifting lenses. Further, the focusing lens 18 images the light deflected by the light deflector 16 at a predetermined position on the recording medium 24 wound around the drum 22.

The light reflected by the MMA 12 is finally imaged on the surface of the recording medium 24 held on the external surface of the drum 22. Examples of the recording medium 24 include a light mode photosensitive material and a heat mode photosensitive material. Further, the form of recording medium 24 is not particularly limited and may be a film or a plate as long as it has sensitivity to light, heat, etc.

It should be noted here that although the present embodiment concerns a case where a recording medium is wound around the external surface of the drum 22, the present invention is not limited to this construction. That is, an image may be recorded on a drum-shaped recording medium formed by applying a photosensitive material or the like directly onto the surface of a cylindrical medium, such as a drum, that is sensitive to light, heat, or the like.

The (outer) drum 22 is a cylindrical rotating drum that holds the recording medium 24 wound around the external surface thereof and rotates at a constant speed in the direction shown by the arrow T in FIG. 1 about an axis.

The light source, the MMA 12, the collimator lens 14, the light deflector 16, and the focusing lens 18 of the optical system are integrated together as a unit and are moved by an auxiliary scanning drive system 20 at a constant speed in the auxiliary scanning direction (the direction shown by the arrow S in FIG. 1). The auxiliary scanning drive system 20 includes a moving base 20a on which the optical system is mounted and a moving axis 20b on which the moving base 20 moves.

Further, FIG. 2 shows a block diagram of the image recording apparatus 10 in accordance with the first embodiment mode of the present invention including the control system of recording timing in accordance with an embodiment of the present invention. FIG. 2 shows a control system for controlling the various components added to the arrangement shown in FIG. 1.

As shown in FIG. 2, the optical system such as the light source 11, the MMA 12 and the light deflector 16 (the collimator lens 14 and the focusing lens 18 are not shown in FIG. 2) are integrated together and can continuously move at a predetermined speed in the auxiliary scanning direction S by the auxiliary scanning drive system (auxiliary scanning unit) 20.

The light deflector 16 deflects the light reflected (modulated) by the MMA 12 in the main scanning direction M in synchronism with the rotation of the drum 22 as described above. A main scanning position detector 26 is disposed for the drum 22 to control the timing of the deflection. For example, a rotary encoder, which detects a rotational position of the drum 22, can be used as the main scanning position detector 26. Further, an auxiliary scanning position detector 28 is disposed for the auxiliary scanning drive system 20 to detect an auxiliary scanning position.

Further, a modulation data generator 30 is disposed for the MMA 12 to send the image data (modulated data) of each frame to the MMA 12 while changing the control pattern in the MMA 12.

An image signal is supplied to the modulation data generator 30, and modulation data is changed based on the detection signals from the main scanning position detector 26 and the auxiliary scanning position detector 28 and then sent to the MMA 12.

Further, a light deflector driver 32 for driving the light deflector 16 is disposed for the light deflector 16. The light deflector driver 32 drives the light deflector 16 based on the detection signal from the main scanning position detector 26 so that the light reflected by the MMA 12 can be deflected in the main scanning direction M in synchronism with the rotation of the drum 22.

The operation of the image recording apparatus 10 of this embodiment and an image recording method of the first embodiment of the present invention will be described below with reference to the drawings.

Figure 3A:
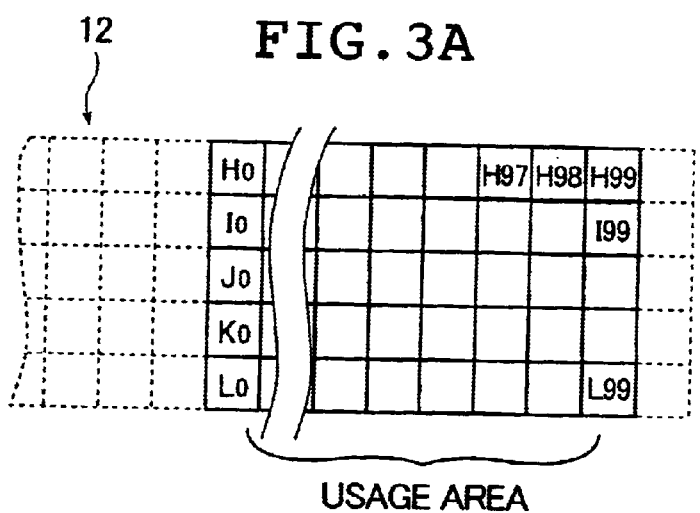
FIGS. 3A, 3B, and 3C each illustrate a state where modulation data is shifted on a micro mirror array (MMA) in order to prevent the flow of an image in the auxiliary scanning direction according to the embodiment of the present invention.

In the present embodiment, when one image (an overall image to be recorded on a single recording medium) is recorded, the overall image is divided into small segments each referred to as a frame. To record one frame, the whole of the MMA 12 is not used but only a part thereof is used, as shown in FIG. 3A. Here, for ease of explanation, it is assumed that the size of one frame is 5×100 pixels. Accordingly, the size of the used part of the MMA 12 is also 5×100 pixels.

When an image is to be recorded, first, modulation data "H0 to H99, I0 to I99, J0 to J99, K0 to K99, and L0 to L99" corresponding to the image of a first frame in the image is sent from the modulation data generator 30 to the MMA 12, as shown in FIG. 3A. Then, the respective micromirrors of the MMA 12 are controlled for activating and deactivating in accordance with this modulation data. When illumination light from the light source 11 impinges on the MVA 12 whose micromirrors are controlled for activating and deactivating in accordance with the modulation data as described above, recording light that carries the image data of one frame corresponding to the modulation data is obtained. The recording light is imaged on the recording medium 24 held on the external surface of the rotating drum 22 through the optical system including the collimator lens 14, the light deflector 16, and the focusing lens 18.

The drum 22 rotates in the direction shown by the arrow T in the drawing at a constant speed. The light deflector 16 is driven by the light deflector driver 32 based on a detection signal of the main scanning position detector 26 in synchronism with the speed of the drum 22, so that the image of one frame that is imaged on the recording medium 24 and includes 5×100 pixels does not flow but remains stationary on the recording medium 24 with respect to the main scanning direction.

The image of one frame composed of 5×100 pixels (H0 to L99) is recorded (exposed) while the drum 22 is rotating by an angle corresponding to at least one frame (an angle corresponding to five pixels, in this example).

Here, the optical system moves at a constant speed in the auxiliary scanning direction S even while the light deflector 16 is controlling and deflecting light in the stated manner so that the image of one frame remains stationary on the recording medium 24 with respect to the main scanning direction. Accordingly, if no measures are taken, although the image of one frame remains stationary on the recording medium 24 with respect to the main scanning direction, the image flows in the auxiliary scanning direction. To solve this problem, in this embodiment, based on a detection signal of the auxiliary scanning position detector 28, the image (modulation data) of one frame is also moved (shifted) on the MMA 12 in a direction opposite to the auxiliary scanning direction in synchronism with the movement of the optical system in the auxiliary scanning direction. As a result of this operation, the image of one frame also remains stationary on the recording medium 24 in the auxiliary scanning direction.

Figure 3B:
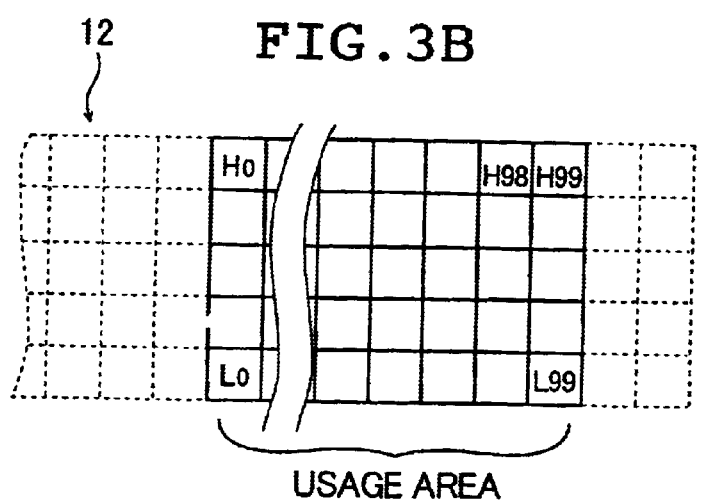
Figure 3C:
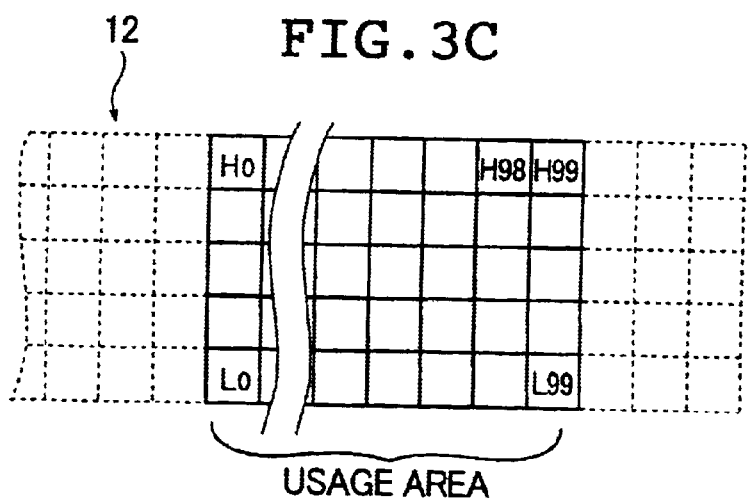

With this, a usage area on the MMA 12 that produces recording light which carries image data of one frame is shifted in a direction opposite to the moving direction of the optical system in accordance with the movement of the optical system in the auxiliary scanning direction. In more detail, the auxiliary scanning position detector 28 detects the movement of the optical system in the auxiliary scanning direction by one pixel. As shown in FIG. 3B, in accordance with the movement of the optical system, the usage area (5×100 pixels) of the MMA 12 is shifted in its entirety by one pixel in a direction opposite to the auxiliary scanning direction (leftward in the drawing). When the optical system further moves by one pixel in the auxiliary scanning direction, the usage area of the MMA 12 is shifted again by one pixel leftward in the drawing, as shown in FIG. 3C.

By shifting the usage area of the MMA 12 for producing recording light in accordance with the movement of the optical system in the auxiliary scanning direction in this manner, it becomes possible to have the image also remain stationary on the recording medium 24 in the auxiliary scanning direction.

While the drum 22 is rotating by an angle corresponding to one frame, recording is performed for an image (H0 to L99) of the same one frame. When the drum 22 has rotated the angle corresponding to one frame, the light deflector 16 returns to its original position, the MMA 12 receives modulation data of the next one frame, and an image of the next one frame is recorded in the same manner as above.

Figure 4:
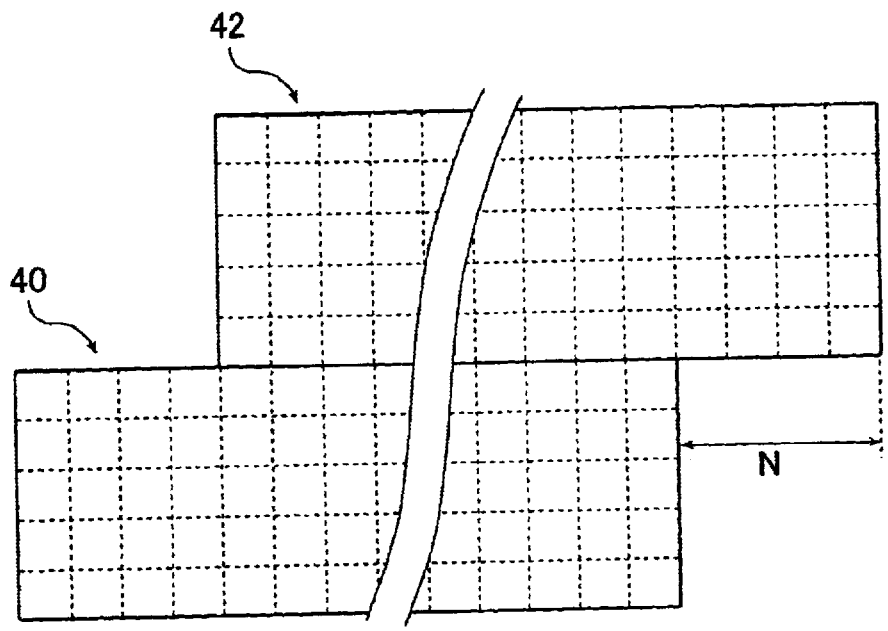
FIG. 4 illustrates an example of a deviation between a preceding frame and a succeeding frame in the auxiliary scanning direction.

Here, it is assumed that there exists a deviation of N pixels between a preceding frame 40 and a succeeding frame 42, as shown in FIG. 4. That is, in this case, while the drum 22 is rotating by an angle corresponding to one frame (five pixels, in this example), the optical system moves in the auxiliary scanning direction by N pixels. In FIG. 4, there is shown a case of N=4.

In this manner, while the drum 22 is rotating once, an image of the first line is recorded in which frames are arranged in a step-like manner in the vertical direction, as shown in the drawing. When the image recording for the first line is finished, an image of the second line is then recorded alongside the image of the first line in accordance with the next rotation of the drum 22. Note that during this operation, when the drum 22 finishes the first rotation and starts the second rotation, control is performed based on the detection signals of the main scanning position detector 26 and the auxiliary scanning position detector 28 so that corresponding modulation data is sent in accordance with the first recording position for the second line.

Figure 5:
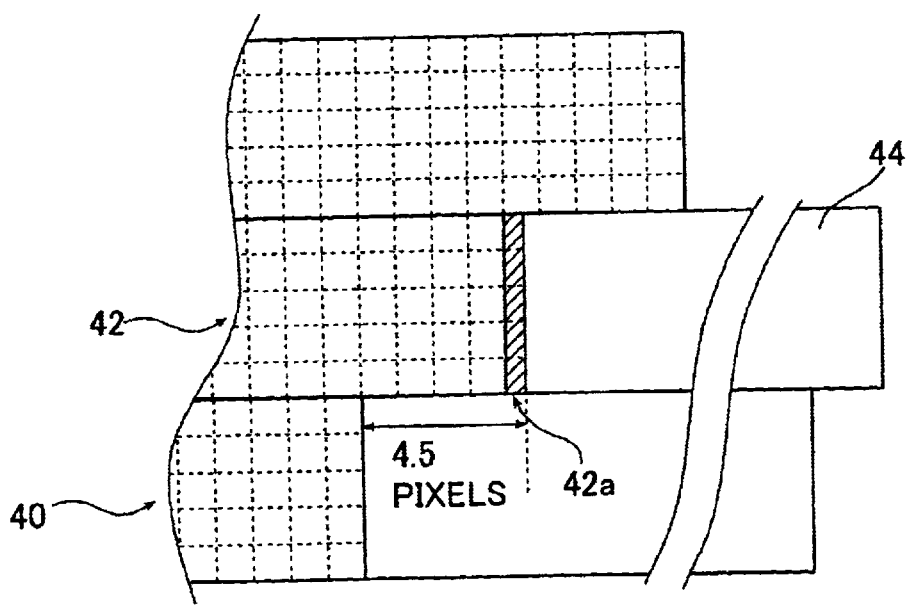
FIG. 5 illustrates another example of a deviation between a preceding frame and a succeeding frame in the auxiliary scanning direction.

As described above, in the case where the preceding frame and the succeeding frame deviate from each other in the auxiliary scanning direction by an integral multiple of one pixel, control is always performed in the same manner during image recording. However, there may be cases where the deviation in the auxiliary scanning direction between the preceding and succeeding frames is not an integral multiple of one pixel. For instance, as shown in FIG. 5, if there exists a deviation of 4.5 pixels between the preceding frame 40 and the succeeding frame 42 in the auxiliary scanning direction, recording is performed so that a pixel row 42a at the right end of the frame 42 constructs one pixel with a pixel row at the left end of a frame 44 that is recorded alongside the frame 42 by image recording for the next line. As a result, it becomes necessary to perform shift control at an early timing so that these pixel rows are processed under the same exposure conditions as those applied to pixels in other portions.

As described in detail above, in this embodiment, the usage area of the two-dimensional spatial light modulator is shifted in accordance with the movement in the auxiliary scanning direction in order to prevent the flow of an image in the auxiliary scanning direction. Consequently, each pixel of an image to be recorded is formed by a multiple exposure operation of a plurality of spatial light modulator elements. As a result, even if there are defects in some of the spatial light modulator elements, these defects do not conspicuously affect the recorded image. Also, for instance, by performing a correction operation using, for example, different recording periods of time for pixels including no defects and pixels including defects, it becomes possible to eliminate the effect of the pixels including defects from a recorded image.

Also, because a light beam may be arranged so as to deflect one-dimensionally only in the main scanning direction, it becomes possible to simplify the construction of an apparatus and to continuously move the optical system in the auxiliary scanning direction. As a result, it becomes possible to prevent the occurrence of vibrations in an apparatus, to increase the durability and reliability of the apparatus, and to improve the productivity.

Next, an image recording method in accordance with a third aspect of the present invention and an image recording apparatus in accordance with a fourth aspect of the present invention will be described with reference to FIGS. 6 to 11.

Figure 6:
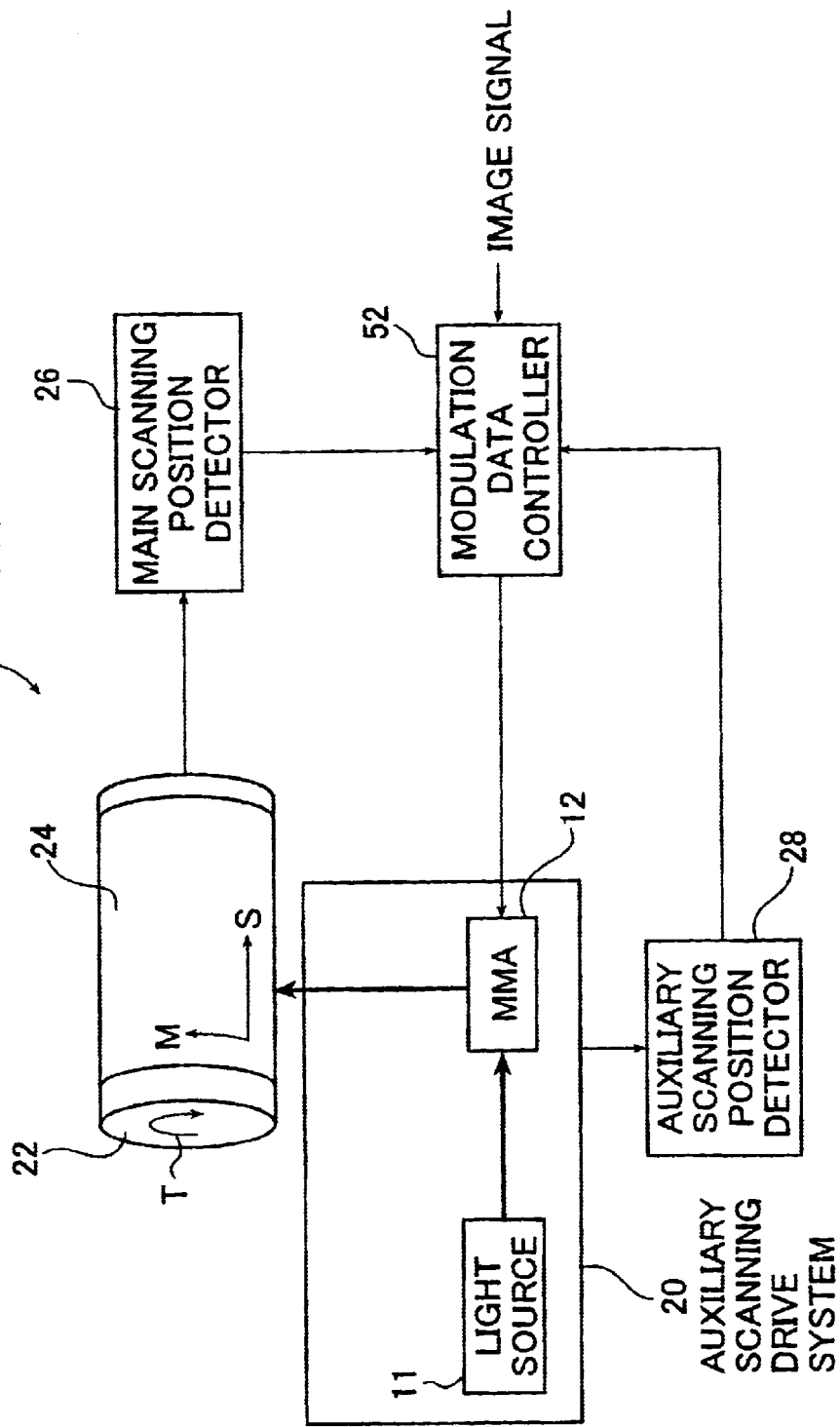
FIG. 6 is a block diagram showing the schematic construction of an image recording apparatus in accordance with another embodiment of the present invention that carries out an image recording method of the present invention.

FIG. 6 is a block diagram showing the schematic construction of the image recording apparatus of an embodiment in accordance with the fourth aspect of the present invention that carries out the image recording method in accordance with the third aspect of the present invention. Here, this block diagram includes an embodiment of a recording timing control system.

Like the image recording apparatus 10 shown in FIG. 1, the illustrated image recording apparatus 50 in accordance with the second embodiment of the present invention is an apparatus for recording an image by two-dimensionally scan-exposing a recording medium held on a so-called outer drum (external surface drum) using a DMD (digital micromirror device) as a group of light source elements disposed in a two-dimensional manner. Here, the DMD is a two-dimensional spatial light modulator to be illuminated with an illumination light flux.

The image recording apparatus 50 shown in FIG. 6 has the same construction as the image recording apparatus 10 shown in FIG. 1 except that the image recording apparatus 50 includes a modulation data controller 52 in place of the light deflector 16, the light deflector driver 32, and the modulation data generator 30. Therefore, the same construction elements as in FIG. 1 are given the same reference numerals and are not described in detail below.

In FIG. 6, the image recording apparatus 50 includes a light source 11, an MMA 12 that reflects an illumination light flux emitted from the light source 11, an auxiliary scanning drive system 20 on which an optical system including the light source 11 and the MMA 12 is mounted and which moves the optical system in the auxiliary scanning direction, a rotating drum 22 on whose external surface is held a recording medium 24, a rotational drive source (not shown) for the drum 22, a modulation data controller 52 that receives an image signal, generates modulation data to be supplied to the MMA 12, and controls the modulation data, and a main scanning position detector 26 and an auxiliary scanning position detector 28 that detect timing signals for controlling the modulation data.

The optical system that records an image on the recording medium 24 includes the light source 11 mounted on the auxiliary scanning drive system 20, the MMA 12 that is a two-dimensional spatial light modulator, a collimator lens (refer to reference numeral 14 in FIG. 1) and a focusing lens (refer to reference numeral 16 in FIG. 1) that are not shown in FIG. 6 and form an image on the recording medium 24 using light that is emitted from the light source 11 and is reflected by the MMA 12.

These components of the optical system are integrated together as a unit, are mounted on the auxiliary scanning drive system (an auxiliary scanning unit) 20, and are continuously moved at a constant speed in the auxiliary scanning direction S.

Also, the MMA 12 is provided with the modulation data controller 52 that supplies image data (modulation data) of each frame to the MMA 12 by switching its control patterns. This modulation data controller 52 generates modulation data from an input image signal, supplies the modulation data to the MMA 12, and controls the modulation data.

To determine the timings at which the control of the modulation data is performed, the main scanning position detector 26 is provided for the drum 22. Also, to detect an auxiliary scanning position, the auxiliary scanning position detector 28 is provided for the auxiliary scanning drive system 20.

The operation of the image recording apparatus 50 of this embodiment and the image recording method in accordance with the third aspect of the present invention will be described below with reference to the drawings.

In the present embodiment, when one image (an overall image to be recorded on a single recording medium) is recorded, the overall image is divided into small segments each referred to as a frame. To record one frame, the whole of the MMA 12 is not used but only a part thereof is used.

Figure 7:
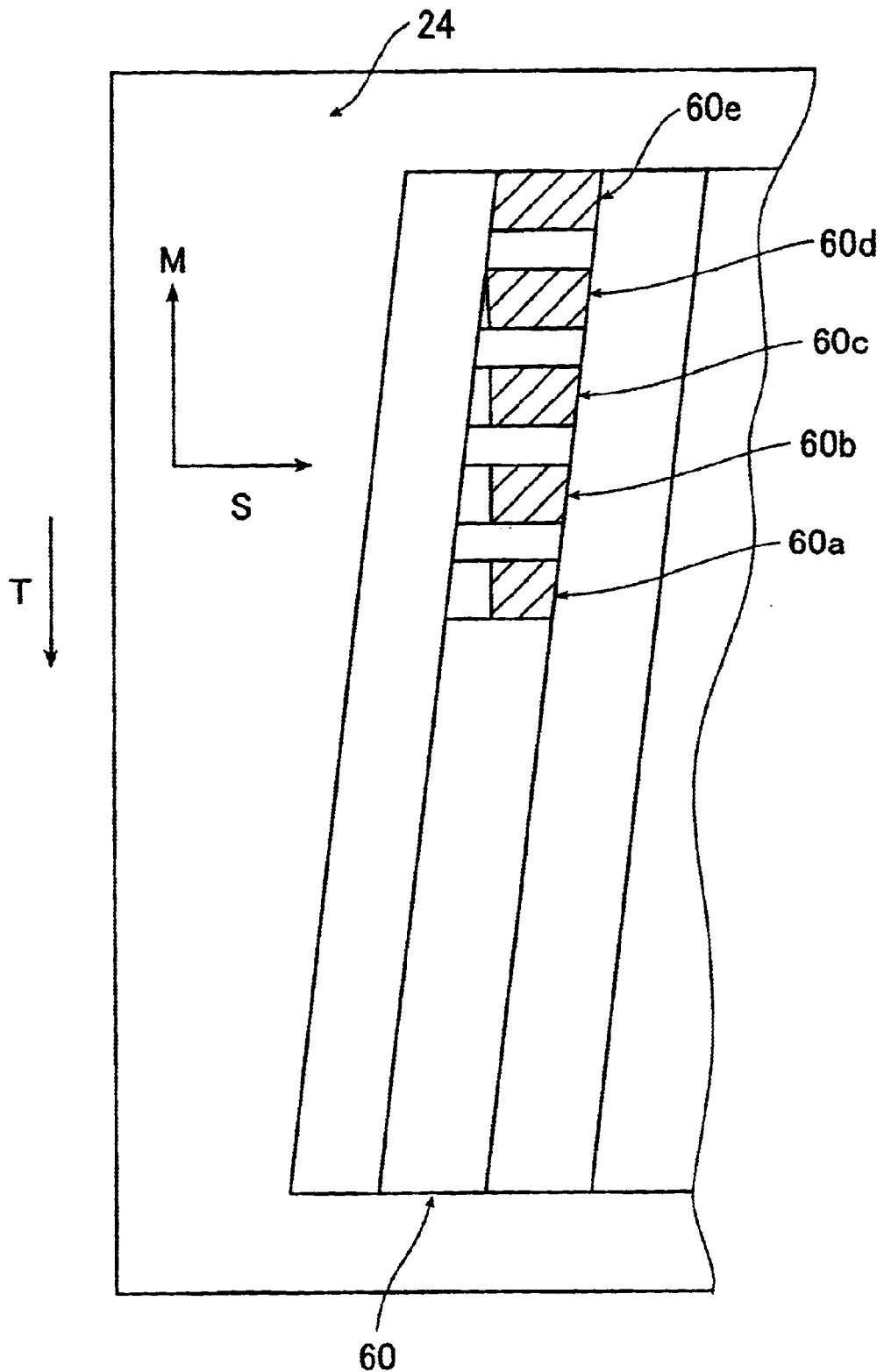
FIG. 7 illustrates the image recording method in accordance with the embodiment of the present invention.

FIG. 7 shows a state where images of frames 60a to 60e are recorded in a column 60 (a portion in which an image is recorded by one rotation of the drum 22) of an image recording area of the recording medium 24. Here, a space is maintained between respective frames in this drawing for easy viewing. In reality, however, there exist no such spaces between respective frames. Note that in FIG. 7, the direction shown by the arrow T is the rotating direction of the drum 22, that is, the moving direction of the recording medium 24. Also, the main scanning direction is indicated by the arrow M and the auxiliary scanning direction is specified by the arrow S.

In FIG. 7, the column 60 extends in a slanting direction to show that if the modulation data is not controlled in the auxiliary scanning direction, an image will be distorted in the illustrated manner due to the continuous movement of the optical system in the auxiliary scanning direction.

In the present embodiment, to prevent the distortion of an image like a parallelogram as a result of image recording that uses the outer drum method described above, the modulation data is shifted on the MMA 12 in accordance with relative movements of the optical system and the recording medium 24 in the main scanning direction and the auxiliary scanning direction.

Figure 8A:
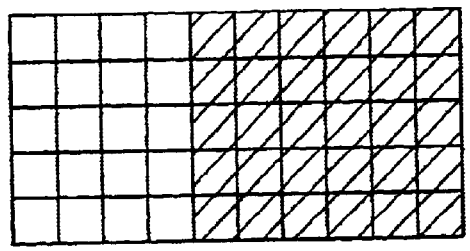
FIGS. 8A, 8B, 8C, 8D, and 8E each illustrate a state where modulation data is shifted according to the embodiment of the present invention.
Figure 16A:
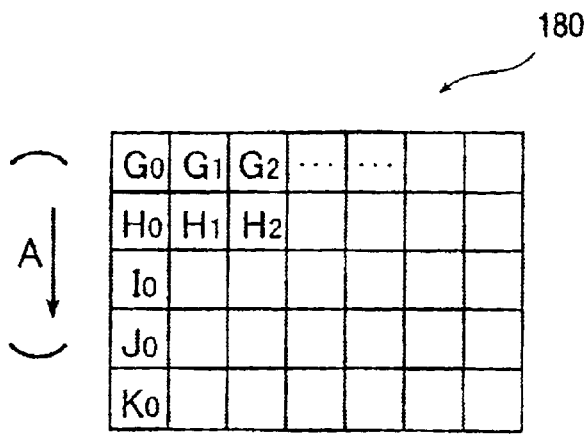
FIGS. 16A, 16B and 16C each illustrate a method of shifting modulation data with the conventional image recording method.
Figure 16B:
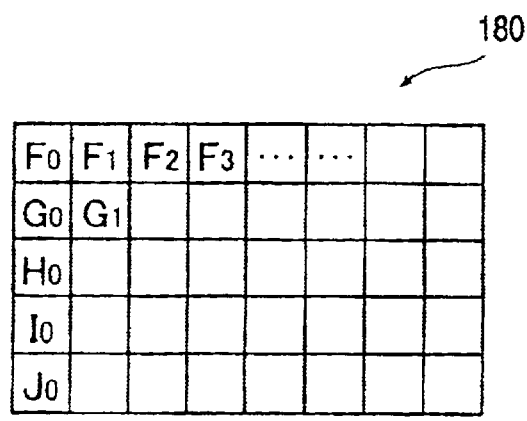
Figure 16C:
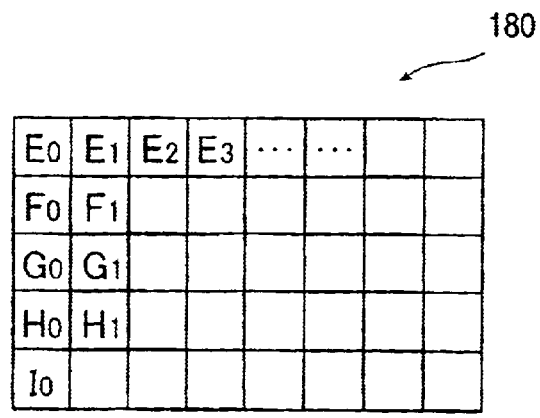
Figure 17:
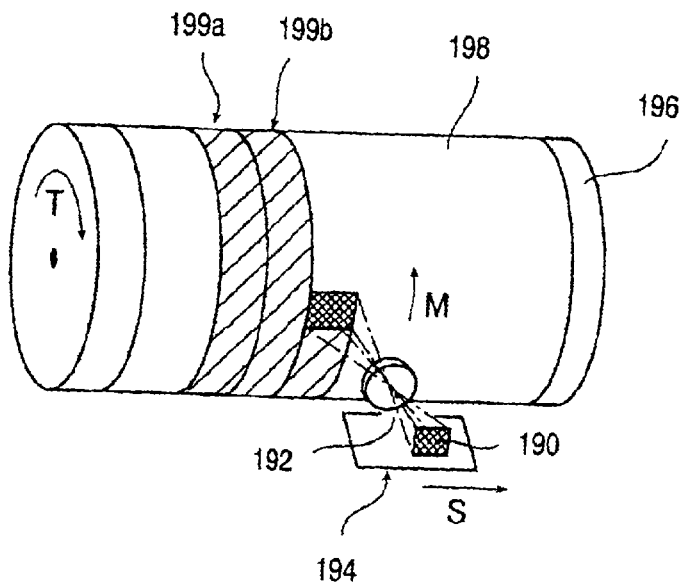
FIG. 17 is a schematic construction view showing an example of an external surface cylinder type recording apparatus (an image recording apparatus using an outer drum method)
Figure 18:
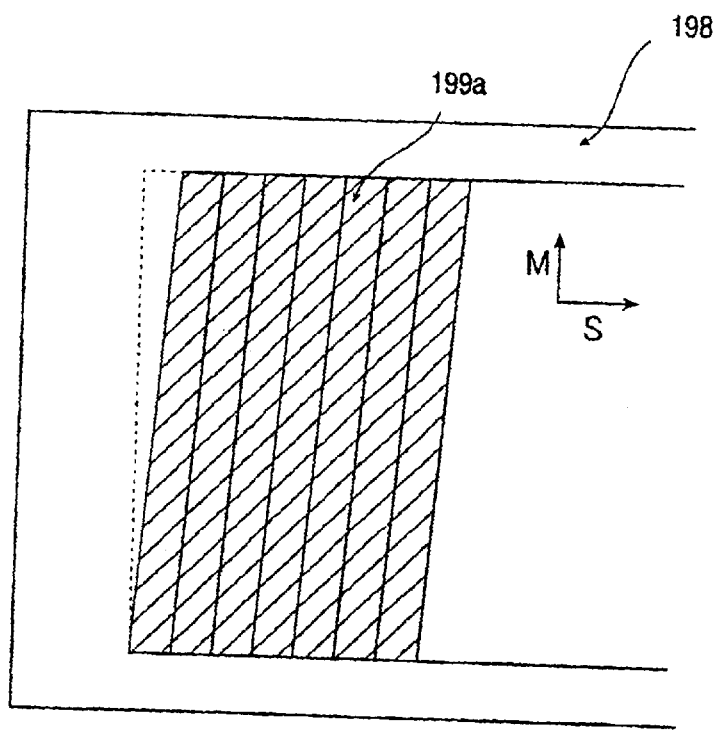
FIG. 18 illustrates a problem of the conventional image recording method.

For instance, to record the frame 60a in FIG. 7, modulation data is given to the MMA 12 in the manner indicated by the slanted lines in FIG. 8A and recording is performed. During the recording of this frame 60a, the drum 22 continuously rotates and the recording medium 24 moves in the direction of the arrow T in FIG. 7. Therefore, as shown in FIGS. 16A to 16C, the modulation data controller 52 shifts the modulation data in a direction opposite to the main scanning direction in synchronism with the movement of the recording medium 24.

Figure 8B:
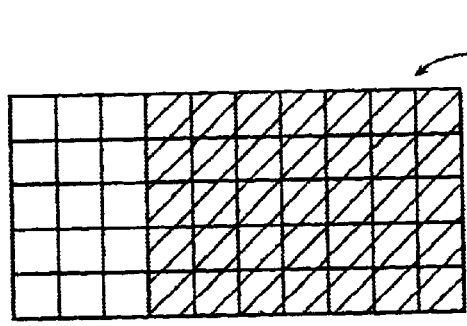

Following this, when the drum 22 has rotated by an angle corresponding to one frame, the next frame 60b is supplied onto the MMA 12. At this time, as shown in FIG. 8B, to prevent a situation where an image flows in the auxiliary scanning direction and a recorded image is distorted like a parallelogram, the modulation data controller 52 shifts the modulation data (image data for recording the frame 60b) in a direction opposite to the auxiliary scanning direction on the MMA 12 in accordance with an image recording position in the main scanning direction. During this operation, the recording position in the main scanning direction is detected by the main scanning position detector 26 and a position in the auxiliary scanning direction is detected by the auxiliary scanning position detector 28. Then, the modulation data is shifted in a direction opposite to the auxiliary scanning direction in accordance with the position in the main scanning direction. The relation between this position and a shift amount is determined by the moving speed of the recording medium 24 (that is, the rotating speed of the drum 22), the moving speed of the optical system in the auxiliary direction, the size of the recording medium 24 (the diameter of the drum 22), the size of each pixel to be recorded, the size of the MMA 12, and the like. This relation between the position and the shift amount will be described in more detail later.

Figure 8C:
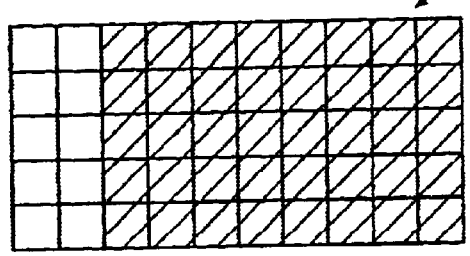
Figure 8D:
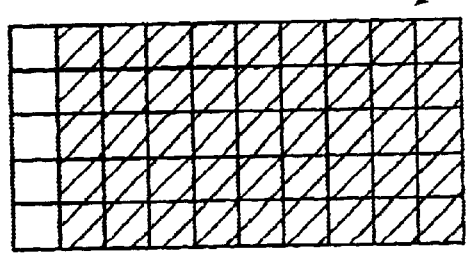
Figure 8E:
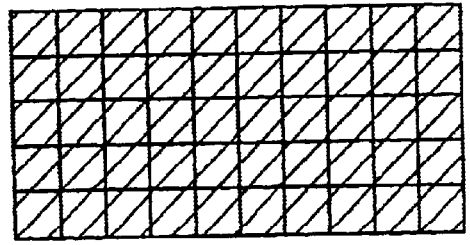

Following these operations, in the same way, the modulation data is shifted on the MMA 12 in the manner shown in FIG. 8C and the frame 60c shown in FIG. 7 is recorded, the modulation data is shifted on the MMA 12 in the manner shown in FIG. 8D and the frame 60d shown in FIG. 7 is recorded, and the modulation data is shifted on the MMA 12 in the manner shown in FIG. 8E and the frame 60e shown in FIG. 7 is recorded.

In FIG. 7, respective frames are shown by maintaining spaces between the frames. In reality, however, these frames are successively recorded without maintaining such spaces and there is obtained a recorded image that is not distorted like a parallelogram.

Figure 9A:
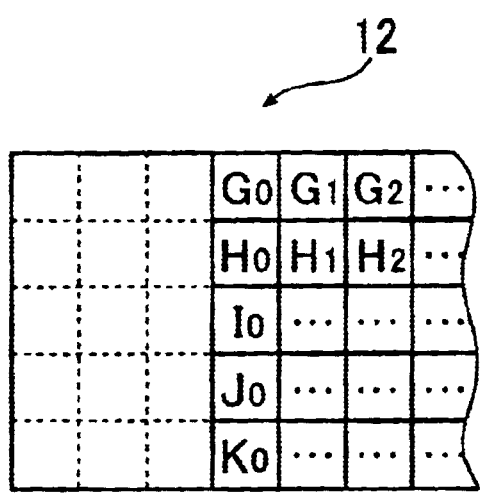
FIGS. 9A, 9B, and 9C each similarly illustrate a state where modulation data is shifted according to the embodiment of the present invention.
Figure 9B:
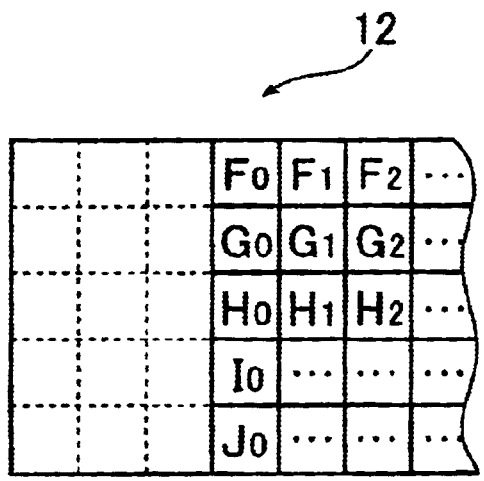
Figure 9C:
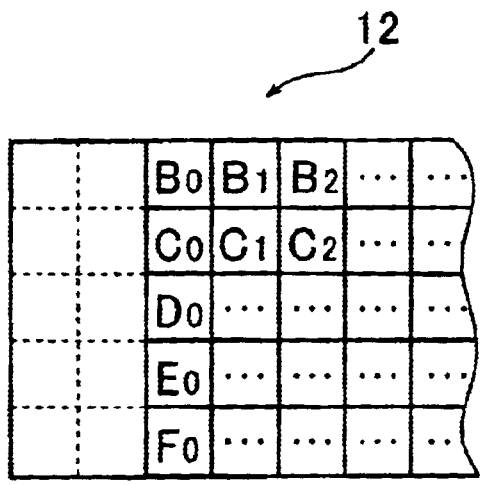

An example of a method of shifting the modulation data is shown in FIGS. 9A to 9C. Here, it is assumed that modulation data of one frame is supplied onto the MMA 12, as shown in FIG. 9A. Because the recording medium 24 moves downward in the drawing (in the main scanning direction) in accordance with the rotation of the drum 22, the modulation data is also shifted downward in synchronism with the movement, as shown in FIG. 9B. Because the modulation data is shifted downward, new modulation data is introduced onto the top row.

From then on, the modulation data is shifted in a direction opposite to the main scanning direction in this manner until the recording medium 24 moves downward by one frame, thereby preventing the flow of an image in the main scanning direction.

The shift of the modulation data in the direction opposite to the main scanning direction is continued and, when the main scanning position detector 26 detects a shift by just one frame, the modulation data is shifted (by one pixel in the illustrated example) leftward in the drawing (in a direction opposite to the auxiliary scanning direction), as shown in FIG. 9C. This operation allows a frame next to the frame shown in FIG. 9A (a frame immediately above a current frame on the column shown in FIG. 7, for instance) to be recorded.

Figure 10:
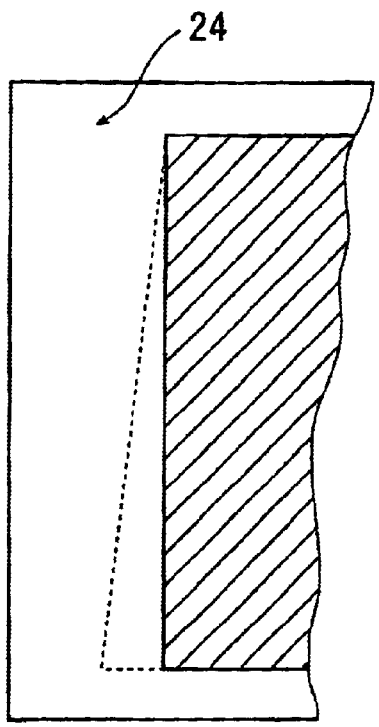
FIG. 10 illustrates an example of a recorded image according to the embodiment of the present invention.

By performing image recording in this manner, a recorded image which is not distorted like a parallelogram and whose left end has a substantially straight line shape is obtained on the recording medium 24, as indicated by the sloped lines in FIG. 10.

Here, in the example described above, the modulation data is shifted by one pixel in the auxiliary scanning direction by one operation, although the present invention is not limited to this shift amount of one pixel. Needless to say, however, it is preferable that the modulation data is shifted only by one pixel by one operation because it becomes possible to obtain a left end that is closest to a straight line.

Figure 11:
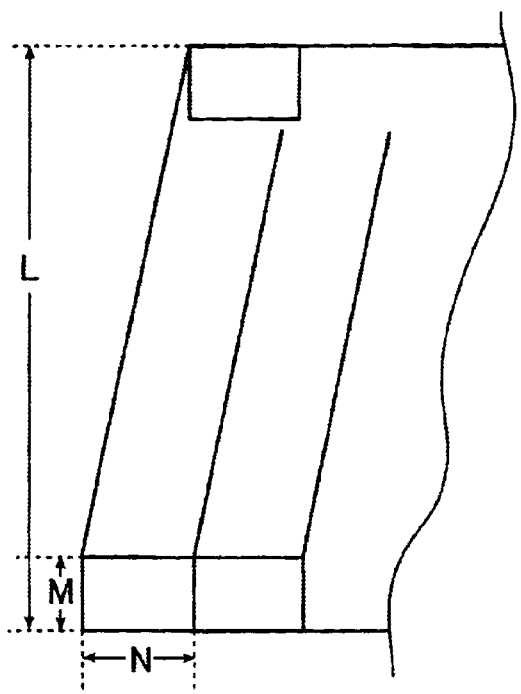
FIG. 11 illustrates a method of calculating a shift amount of modulation data according to the embodiment of the present invention.
Figure 12A:
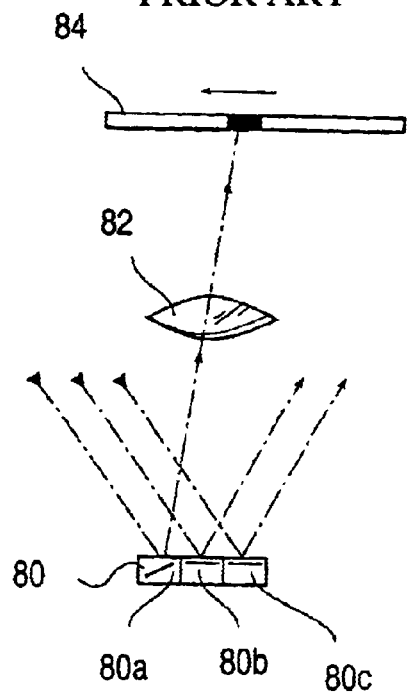
FIGS. 12A, 12B and 12C each illustrate the principle of an image recording method using a conventional spatial light modulator.
Figure 12B:
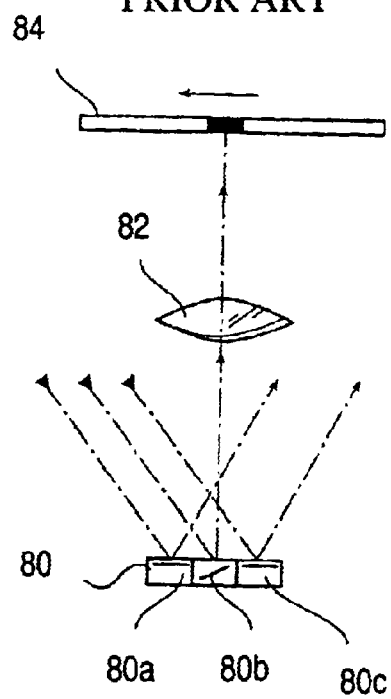
Figure 12C:
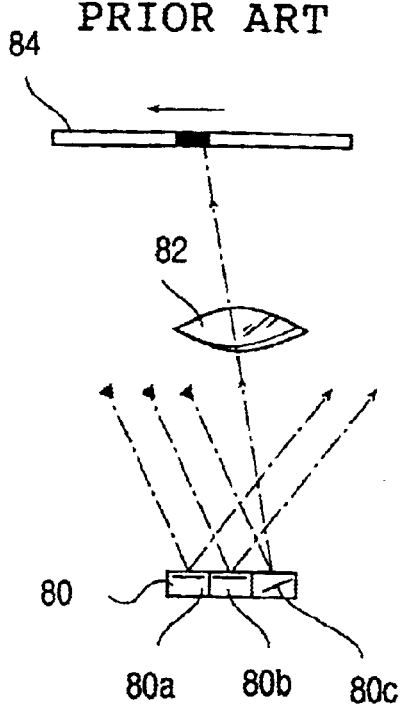
Figure 13:
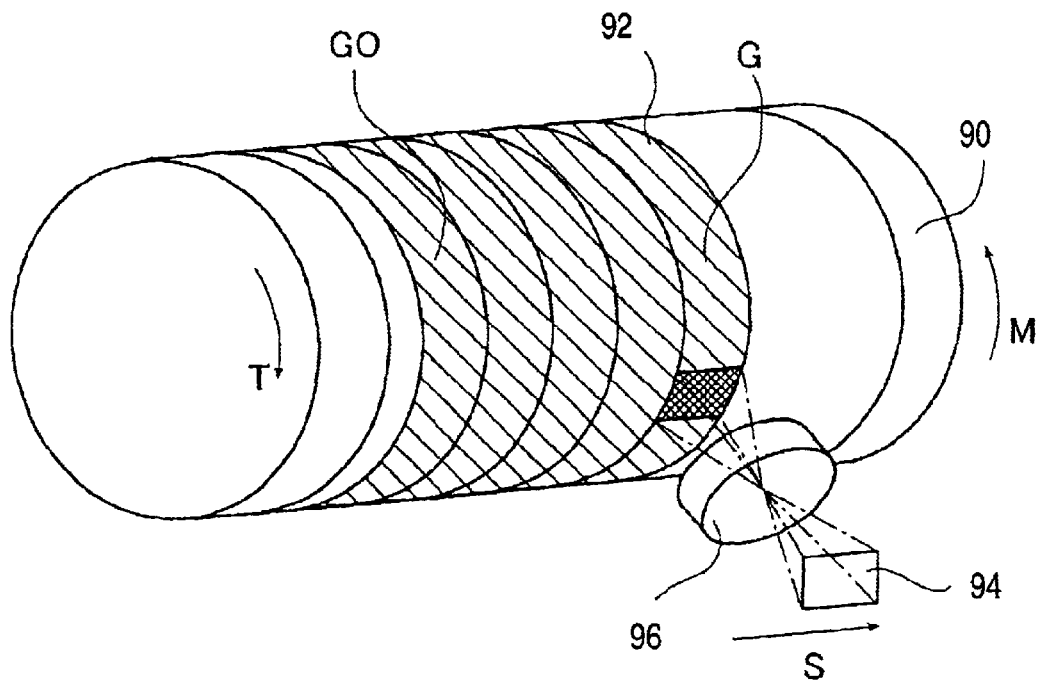
FIG. 13 is a schematic perspective view illustrating an example of a conventional image recording apparatus.
Figure 15:
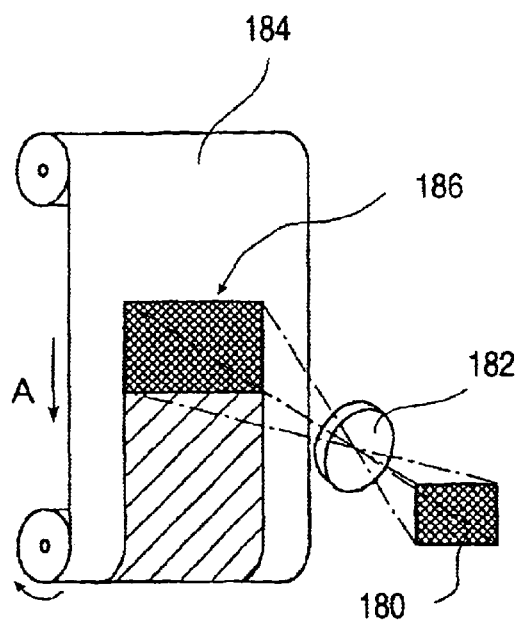
FIG. 15 shows the schematic construction of another conventional image recording apparatus.

As shown in FIG. 11, if the number of pixels in the image recording area of the recording medium 24 in the main scanning direction is set to L, the size of each frame to be recorded by the MMA 12 is set to M pixels in the main scanning direction and N pixels in the auxiliary scanning direction, the shift amount is calculated as follows.

That is, when the recording of one column is finished and the next column is to be recorded, it is required that a shift by one frame is made in the auxiliary scanning direction. In this case, $L/M=n$ frames are recorded for each column in the main scanning direction, so that when modulation data of one frame is shifted in the auxiliary scanning direction, it is appropriate that the shift amount is set at $N/n=n0$ pixels.

In the example described above, while the recording medium is moving by one frame in the main scanning direction, the modulation data is not shifted in the auxiliary scanning direction. However, depending on the relation between the rotating speed of the drum, the moving speed in the auxiliary scanning direction, and the like, the modulation data may also be shifted in the auxiliary scanning direction during the movement by one frame in the main scanning direction. Although a control operation becomes complicated, a recorded image becomes smoother and closer to a straight line in accordance with an increase in the number of times for performing the shift operation.

As described above, in the present embodiment, modulation data is shifted in the main scanning direction in synchronism with the movement of the recording medium and the modulation data is also shifted in the auxiliary scanning direction in accordance with a recording position in the main scanning direction. This makes it possible to obtain a fine recorded image that is not distorted like a parallelogram.

Also, each pixel of an image to be recorded is formed by a multiple exposure operation of a plurality of spatial light modulator elements. As a result, even if some of the spatial light modulator elements include defects, these defects do not conspicuously affect the recorded image. Also, for instance, by performing a correction operation using different recording periods of time for pixels including no defects and pixels including defects, it becomes possible to eliminate the effect of the pixels including defects from a recorded image.

While the image recording method and the image recording apparatus of the present invention have been described above in detail with reference to the various embodiments, the present invention is by no means limited to the above embodiments and it is needless to say that various improvements and modifications can be made within the range which does not depart from the gist of the present invention.

As described above, in accordance with the first and second aspects of the present invention, the flow of a recorded image in the auxiliary scanning direction is prevented by shifting the usage area of a two-dimensional spatial light modulator in an opposite direction in accordance with its movement in the auxiliary scanning direction. Therefore, it becomes possible to have a recorded image remain stationary only by one-dimensionally deflecting a light beam in the main scanning direction. As a result, it becomes possible to simplify the apparatus construction of a deflection synchronization system and to improve the productivity of image recording.

Also, in accordance with the third and fourth aspects of the present invention, modulation data is shifted in the main scanning direction in synchronism with the movement of a recording medium and the modulation data is also shifted in the auxiliary scanning direction in accordance with a recording position in the main scanning direction. As a result, there is obtained a fine recorded image that is not distorted like a parallelogram.

What is claimed is:

1. An image recording method in which when an image is recorded on one recording medium held on an external surface of a drum rotating at a first constant speed, said image being recorded by performing main scanning and exposure on said one recording medium with an optical system that uses a group of two-dimensionally disposed light source elements as well as by performing auxiliary scanning by moving said optical system in an auxiliary scanning direction that is substantially perpendicular to a main scanning direction, comprising the steps of:

deflecting light from said group of two-dimensionally disposed light source elements to move the image formed on said one recording medium in accordance with a movement of said one recording medium, thereby having the image remain stationary relative to said one recording medium in the main scanning direction;

moving said optical system at a second constant speed in the auxiliary scanning direction; and sequentially shifting modulation data of said group of two-dimensionally disposed light source elements in a direction opposite to the moving direction of the optical system in synchronism with a movement of the optical system in the auxiliary scanning direction, thereby having the image also remain stationary relative to said one recording medium in the auxiliary scanning direction.

2. The image recording method according to claim 1, wherein when recording of the image of one frame, which is an image area to be recorded on said one recording medium by said group of two-dimensionally disposed light source elements by one operation, is finished and recording of the image of the next frame is performed, a deviation between the preceding frame and the next frame in the auxiliary scanning direction is an integral multiple of a recording pixel.

3. An image recording apparatus, comprising:

one recording medium held on an external surface of a drum rotating at a first constant speed;

an optical system that uses a group of two-dimensionally disposed light source elements for exposing said one recording medium in a main scanning direction that is a first moving direction of said one recording medium;

a modulation data generator that controls modulation data to be supplied to said group of two-dimensionally disposed light source elements; and an auxiliary scanning drive system that moves the optical system in an auxiliary scanning direction that is substantially perpendicular to the main scanning direction, wherein said optical system includes a deflector that deflects light from said group of two-dimensionally disposed light source elements, an image formed on said one recording medium is moved in accordance with a movement of said one recording medium by deflecting the light using said deflector, thereby having the image remain stationary relative to said one recording medium in the main scanning direction, and said auxiliary scanning drive system moves said optical system at a second constant speed in the auxiliary scanning direction and said modulation data generator sequentially shifts the modulation data of said group of two-dimensionally disposed light source elements in a direction opposite to said moving direction of the optical system in synchronism with a movement of the optical system in the auxiliary scanning direction, thereby having the image also remain stationary relative to said one recording medium in the auxiliary scanning direction.

4. The image recording apparatus according to claim 3, wherein when recording of the image of one frame, which is an image area to be recorded on said one recording medium by said group of two-dimensionally disposed light source elements by one operation, is switched to recording of the image of the next frame, said auxiliary scanning drive system drives the optical system in the auxiliary scanning direction so that a deviation between the preceding frame and the next frame in the auxiliary scanning direction becomes an integral multiple of a recording pixel.

5. An image recording apparatus according to claim 3, wherein said deflector is at least one of a galvano scanner, a piezo system, and a device for shifting lenses.

6. An image recording apparatus according to claim 3, further comprising a light deflector driver for driving the deflector wherein the deflector is driven based on a detection signal from a main scanning position detector.

7. An image recording apparatus according to claim 6, wherein said main scanning position detector is a rotary encoder wherein said rotary encoder detects a rotational position of the drum.

8. An image recording apparatus according to claim 3, wherein said modulation data is changed based on detection signals from a main scanning position detector and an auxiliary scanning position detector.

9. The apparatus of claim 3, wherein said deflector and said modulation data generator operate in cooperation to maintain the image stationary in the main scanning and auxiliary scanning directions concurrently.

10. An image recording apparatus according to claim 3, wherein an image recorded on said one recording medium comprises a plurality of frames, wherein a part of said group of two-dimensional disposed light sources is used to record one of said plurality of frames at a given time.

11. An image recording method in which when an image is recorded on a recording medium that is moved in a given direction at a constant speed relative to an optical system that uses a group of two-dimensionally disposed light source elements, said image being recorded by performing main scanning on said recording medium in the given direction with said optical system as well as by performing auxiliary scanning by moving said optical system relative to said recording medium in an auxiliary scanning direction that is substantially perpendicular to said main scanning direction, comprising steps of:

shifting modulation data of said group of two-dimensionally disposed light source elements in a first moving direction of said recording medium on said group of two-dimensionally disposed light source elements in synchronism with the movement of said recording medium, thereby having the image remain stationary relative to said recording medium in the main scanning direction; and moving said optical system at a constant speed in the auxiliary scanning direction and shifting the modulation data on the group of two-dimensionally disposed light source elements in a direction opposite to said moving direction of said optical system in accordance with an image recording position in the main scanning direction, thereby having the image also remain stationary in the relative relation to said recording medium in the auxiliary scanning direction and suppressing parallelogram-like distortion of the image recorded on said recording medium.

12. The image recording method according to claim 11, wherein a spatial light modulator that reflects an illumination light flux from a light source or allows the illumination light flux to pass through is used as said group of two-dimensionally disposed light source elements.

13. An image recording apparatus, comprising:

an optical system that uses a group of two-dimensionally disposed light source elements;

a recording medium that moves in a given direction at a first constant speed relative to said optical system, an image being two-dimensionally recorded on said recording medium by performing main scanning in the given direction using said optical system and performing auxiliary scanning in a direction that is substantially perpendicular to said main scanning direction;

a modulation data controller that controls modulation data to be supplied to said group of two-dimensionally disposed light source elements; and an auxiliary scanning drive system that moves said optical system in an auxiliary scanning direction at a second constant speed relative to said recording medium, wherein the modulation data is shifted in a first moving direction of the recording medium on said group of two-dimensionally disposed light source elements in synchronism with said movement of said recording medium, thereby having the image remain stationary relative to said recording medium in the main scanning direction, and the modulation data is shifted in a direction opposite to said moving direction of the optical system on said group of two-dimensionally disposed light source elements in accordance with an image recording position in the main scanning direction, thereby having the image also remain stationary relative to said recording medium in the auxiliary scanning direction and suppressing parallelogram-like distortion of the image recorded on said recording medium.

14. The image recording apparatus according to claim 13, wherein a spatial light modulator that reflects an illumination light flux from a light source or allows the illumination light flux to pass through is used as said group of two-dimensionally disposed light source elements.

15. An image recording apparatus according to claim 13, wherein said modulation data controller generates modulation data from an input image signal and supplies said modulation data to the group of two-dimensionally disposed light source elements.

16. An image recording method in which when an image is recorded on a drum-shaped recording medium rotating at a first constant speed, said image being recorded by performing main scanning and exposure on said one recording medium with an optical system that uses a group of two-dimensionally disposed light source elements as well as by performing auxiliary scanning by moving said optical system in an auxiliary scanning direction that is substantially perpendicular to a main scanning direction, comprising the steps of:

deflecting light from said group of two-dimensionally disposed light source elements to move the image formed on said drum-shaped recording medium in accordance with a movement of said drum-shaped recording medium, thereby having the image remain stationary relative to said drum-shaped recording medium in the main scanning direction;

moving said optical system at a second constant speed in the auxiliary scanning direction; and sequentially shifting modulation data of said group of two-dimensionally disposed light source elements in a direction opposite to the moving direction of the optical system in synchronism with a movement of the optical system in the auxiliary scanning direction, thereby having the image also remain stationary relative to said drum-shaped recording medium in the auxiliary scanning direction.

17. An image recording apparatus comprising:

a drum shaped recording medium rotating at a first constant speed;

an optical system that uses a group of two-dimensionally disposed light source elements for exposing said drum shaped recording medium in a main scanning direction that is a first moving direction of said drum shaped recording medium;

a modulation data generator that controls modulation data to be supplied to said group of two-dimensionally disposed light source elements; and an auxiliary scanning drive system that moves the optical system in an auxiliary scanning direction that is substantially perpendicular to the main scanning direction, wherein said optical system includes a deflector that deflects light from said group of two-dimensionally disposed light source elements, an image formed on said drum shaped recording medium is moved in accordance with a movement of said drum shaped recording medium by deflecting the light using said deflector, thereby having the image remain stationary relative to said recording medium in the main scanning direction, and said auxiliary scanning drive system moves said optical system at a second constant speed in the auxiliary scanning direction and said modulation data generator sequentially shifts the modulation data of said group of two-dimensionally disposed light source elements in a direction opposite to said moving direction of the optical system in synchronism with a movement of the optical system in the auxiliary scanning direction, thereby having the image also remain stationary relative to said drum shaped recording medium in the auxiliary scanning direction, said deflector and said modulation data generator operating in cooperation to maintain the image stationary in the main scanning and auxiliary scanning directions concurrently.

\* \* \* \* \*